(No Model.)

W. TENNISON.
REIN HOLDER.

No. 357,427. Patented Feb. 8, 1887.

WITNESSES:
Fred G. Dieterich
Jesse Middleton

INVENTOR:
W. Tennison
BY Munn & Co.
ATTORNEYS.

UNITED STATES PATENT OFFICE.

WILLIAM TENNISON, OF MOUNT VERNON, INDIANA.

REIN-HOLDER.

SPECIFICATION forming part of Letters Patent No. 357,427, dated February 8, 1887.

Application filed January 2, 1886. Serial No. 187,466. (No model.)

*To all whom it may concern:*

Be it known that I, WILLIAM TENNISON, of Mount Vernon, in the county of Posey and State of Indiana, have invented a new and useful Improvement in Rein-Holders, of which the following is a specification.

My invention is an improvement in the class of rein-holders consisting of a skeleton frame adapted for attachment to a harness or for support upon a horse's back, and used for the purpose of supporting the reins out of the way of the animal's tail.

The construction of my improvement is as hereinafter described and claimed.

Figure 1:
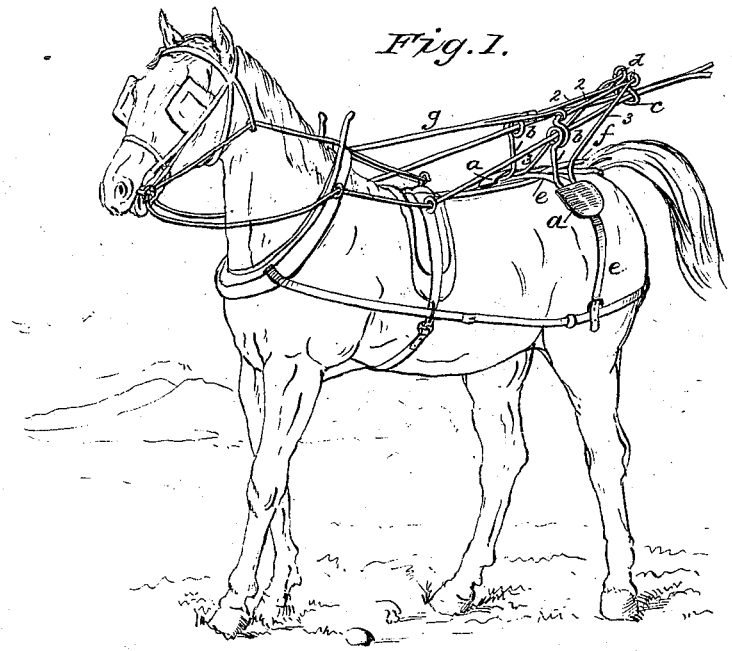
Figure 2:
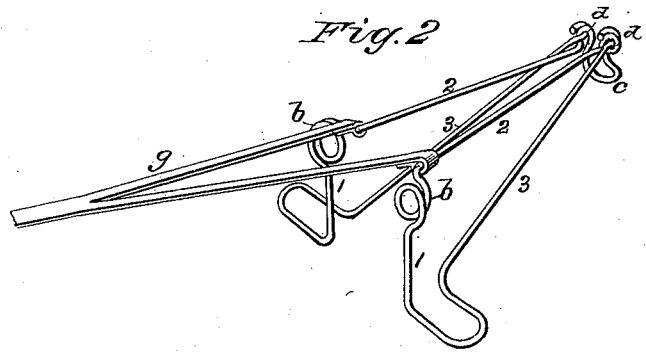
Figure 3:
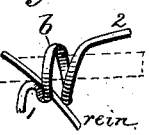

In the accompanying drawings, Figure 1 is a perspective view showing my invention applied to a horse and supporting the reins as when in use. Fig. 2 is a perspective view of the invention without the pads and hip-strap. Fig. 3 is a perspective view showing one of the rings through which the reins pass, and illustrating the manner of inserting a rein in said ring.

The frame of the rein-holder is formed of one piece of wire bent into the required shape. It consists, mainly, of two vertical bars, 1 1, horizontal bars 2 2, and diagonal braces 3 3. The bars 1 1 are separated a foot or more; but the bars 2 2 and braces 3 3 converge till their rear ends meet. At the junction of the bars 1 1 and braces 3 3 the wire is bent outward to form feet that enter pockets in pads $a$, adapted to rest on the horse's back, as shown in Fig. 1. At the junction of the bars 1 1 and 2 2 the wire is bent into coils or rings $b$, that serve as rein-guides. Another rein-guide, $c$, is formed at the rear end of the frame by bending the terminal portion of bars 2 2 into a loop, which is inclined downward, as shown.

The rear ends of the braces 3 3 are hook-shaped, and constitute terminals of the wire forming the rein-holder frame. They are firmly united to the bars 2 2 by hooking them into eyes $d$, formed in bars 2 2, contiguous to the rein-guide $c$.

The coils or convolutions of the aforesaid guides $b$ are separated far enough to permit a rein to be passed between the coils, as illustrated in Fig. 3. The pads $a$ are preferably made of leather and secured to and connected by a strap, $e$, which is also attached to the crupper or back-band $f$.

To secure the rein-holder on a horse, the pads $a$ are placed on the animal's hips, just in rear of the loins or hip-bones, as shown, and the ends of strap $e$ buckled to the traces or tugs or to rings on the breeching. In this case they are shown attached to the breeching. A strap, $g$, is also attached to the bars 2 2, just in rear of the rings $b$, and extends forward to a point of attachment on the hames or back-strap—in this instance, the former. Said strap $g$ aids in supporting the rein-holder in the required position—that is, with the bars 1 1 vertical and bars 2 2 horizontal—so that rein-guide $c$ is suspended over the horse's tail. One rein passes through one of the ring-guides $b$ and the other through the opposite one $b$, and both through the rear guide, $c$. They are thus supported in such position that the horse cannot catch them when switching its tail from side to side. The construction of the front guides permits the reins to be passed into them laterally without requiring the reins to be unbuckled for the purpose.

What I claim is—

1. A skeleton frame for a rein-holder, composed of vertical and horizontal bars 1 3, having feet, as specified, and the diagonal braces having rein-guides, substantially as shown and described.

2. In a skeleton frame for a rein-holder, the combination of the front single rein-guides formed of convolutions or coils, the rear double rein-guide $c$, and bars for connecting said front and rear guides, as shown and described, whereby the reins may be inserted in and detached from the three guides without unbuckling them, as specified.

3. The skeleton frame for a rein-holder, consisting of a wire bent into the shape specified—that is to say, forming the vertical bars 1 1, horizontal bars 2 2, diagonal braces 3 3, and rein-guides and feet, as shown and described.

4. The wire skeleton frame for a rein-holder, having bars 2 2 bent as specified, thus forming the guide $c$ and eyes $d$, and the diagonal braces which engage with said eyes, as shown and described.

WILLIAM TENNISON.

Witnesses:
JOHN PFEFFER, Jr.,
JOHN L. GRANT.